United States Patent [19]

Choate et al.

[11] 4,351,004
[45] Sep. 21, 1982

[54] CCD IMAGER

[75] Inventors: William C. Choate, Dallas; David S. Ho, Garland, both of Tex.

[73] Assignee: Texas Instruments Incorporated, Dallas, Tex.

[21] Appl. No.: 117,178

[22] Filed: Jan. 31, 1980

[51] Int. Cl.$^3$ .............................................. H04N 3/14
[52] U.S. Cl. .................................... 358/213; 358/282; 250/211 J
[58] Field of Search ............... 358/282, 280, 213, 212, 358/138; 250/211 J

[56] References Cited

U.S. PATENT DOCUMENTS 3,877,821 9/1975 Price et al. ........................... 358/106
4,216,503 8/1980 Wiggins ............................... 358/280

OTHER PUBLICATIONS

Michael G. Kovac "Charge Transfer Image Sensor" 9-6-73, RCA Technical Notes #937.

Primary Examiner—Robert L. Richardson
Assistant Examiner—Edward L. Coles
Attorney, Agent, or Firm—Robert Groover, III; James T. Comfort; Melvin Sharp

[57] ABSTRACT

A CCD imager is provided with an adaptive threshold circuit. The variations in the illumination across the document being read by the imager are compensated for by the adaptive threshold circuit to accurately provide an accurate digital representation of the image on the document.

12 Claims, 5 Drawing Figures

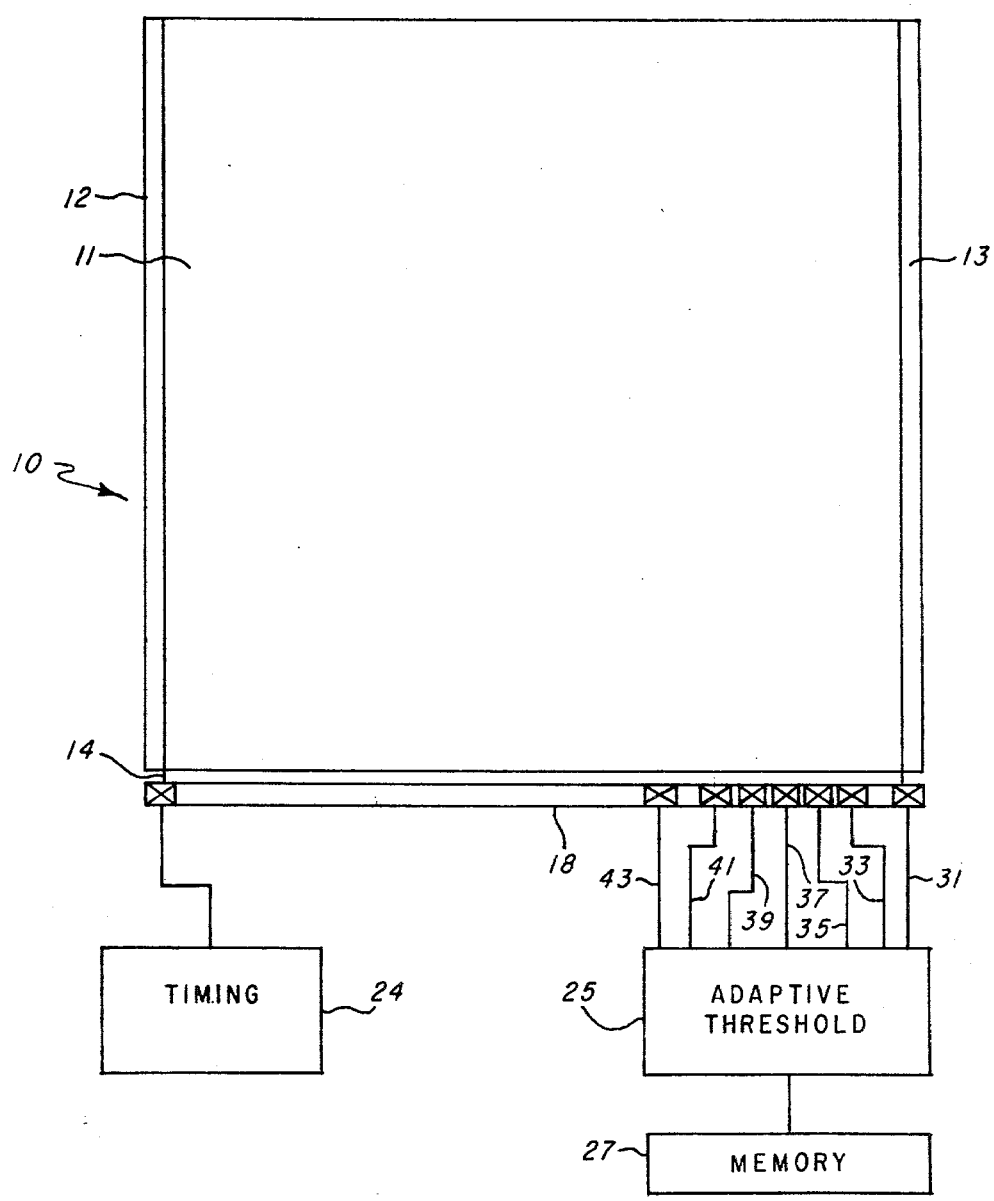

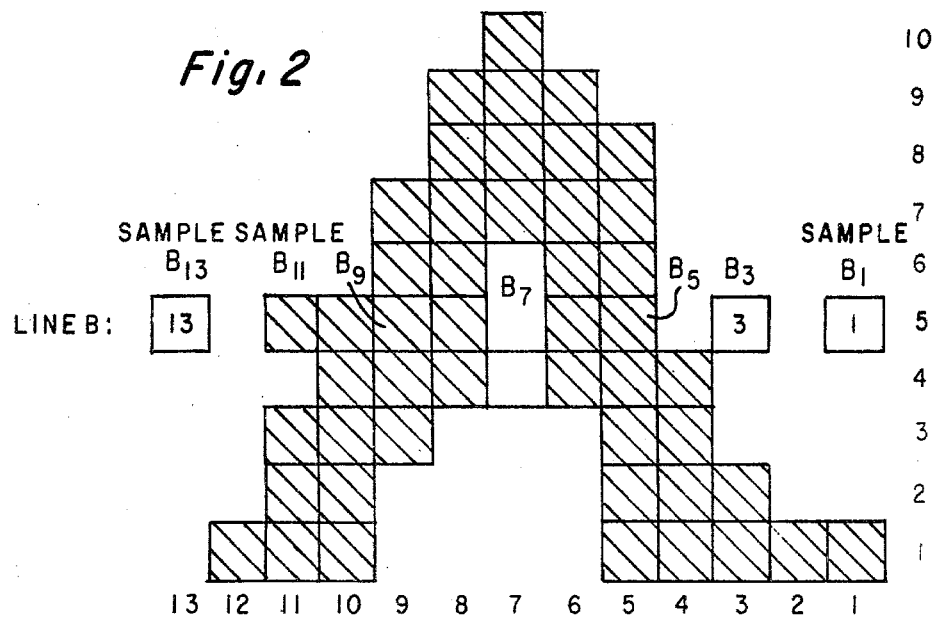
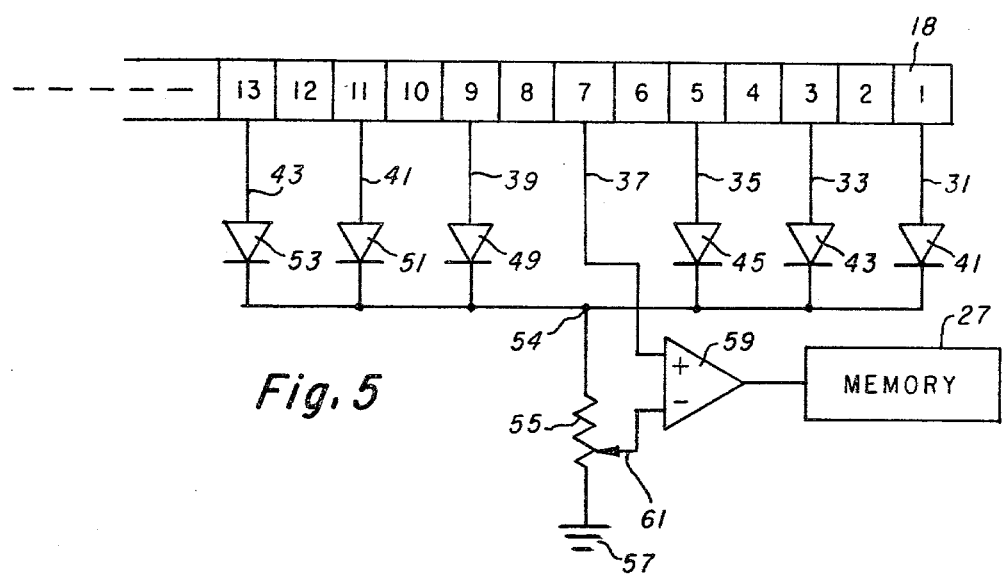

CCD IMAGER

This invention relates to a CCD imager. More particularly, it relates to a CCD imager used in a staring wand.

CCD's have become an important new development in the art of imagers. Imagers in general are used to take a picture of a particular visual scene. One application of imagers has been in a device that has come to be known as a wand. Wands are used to read printed material on a document or a ticket attached to an item of commerce such as an item of food or clothing. Wands are particularly useful with point of sale terminals. A sales person, instead of reading the price and description of an item and then keying into a cash register the price information and description of the item, simply takes the wand and passes the wand over the price and description ticket. The wand automatically reads price and descriptive material and stores the information in the point of sale terminal. The readin information controls the cash register function, and the information can also be used to determine the inventory, the items that have been sold, the total sold from that department, etc. Wands have in the past been primarily scanning wands. Scanning wands are wands which read as they are moved across the sales information. This invention is specifically addressed to a staring wand. A staring wand is a wand which will read the total information on the document without any motion relative to the document. This will mean that the area of the imager will have to be large enough to simultaneously capture all information on the document or on the item itself.

A particular problem in a staring wand is the fact that it is difficult or costly to achieve uniform illumination across the entire document or ticket at the time it is read. Normally, a staring wand, as all wands, will depend upon the reflection from the document being read. There must be, therefore, illumination. This illumination can either result from the ambient illumination from the environment or there must be a separate light source provided with the wand to directly illuminate the document to be read.

Since the light source is typically close to the document, uniform illumination across the entire document can be achieved only at considerable expense and increased illumination power requirements.

In imagers using CCD's an analogue voltage is stored in each pixel of the CCD. This voltage is proportional to the amount of reflection under each pixel. This analogue voltage necessarily varies because of the variation in illumination, the variation in the reflection from the ink of the image to be captured itself, and the variation in reflection from the paper source. For instance, a smudge on a paper or on a ticket will cause less reflection than from clear paper and if there is not a procedure and equipment provided to accommodate such variations, there may be errors in reading the information from the document or ticket.

In a wand using an imager we are seeking a binary output, in other words, a one or a zero with a zero reflecting the fact that there is an image of a character stroke under the pixel and a one reflecting that there is no such image but merely the background of the paper of the document itself. Therefore, it is desirable to turn the analogue voltage captured in each CCD pixel into a digital one or zero output from that pixel. Then, taking the combination of ones and zeros from the readout from the imager, this combination will be stored in a memory representative of the image being read. Digital processing will then be carried out to determine what image is actually on the paper. This invention that is described and claimed herein is not specifically directed to the problem of processing the information to determine what image is read from the document but is specifically directed to the problem of providing a digital output from the imager as opposed to the analogue information that is stored in each pixel of the imager.

Accordingly, it is an object of this invention to provide a new and improved staring wand.

Another possible application of this staring wand other than using it as a wand in a retail application for reading tickets would be as a document reader. This would be where one is seeking to read information from a typewritten document and storing it into the computer for future printing out or for transmission of information in a facsimile transmission system.

Accordingly, it is an object of this invention to provide a new and improved imager. Another object of this invention is to provide a new and improved CCD imager.

Another object of this invention is to provide a new and improved imager that is used in a static mode and adjusts for uneven illumination across the document.

Another object of this invention is to provide a new and improved static CCD imager that provides a digital output from the imager.

Another object of this invention is to provide an on-chip adaptive threshold for each pixel of the CCD imager.

Another object of this invention is to provide an adaptive means of accommodating a wide range of ambient illumination levels under which the imager may be required to operate.

IN THE DRAWINGS

FIG. 1 is a block plan view of a CCD imager.

FIG. 2 is plan view of sample character as viewed by a sample portion of the imager shown in FIG. 1.

FIG. 5 is a block diagram of the adaptive threshold circuit.

DETAILED DESCRIPTION OF THE INVENTION

Figure 4:
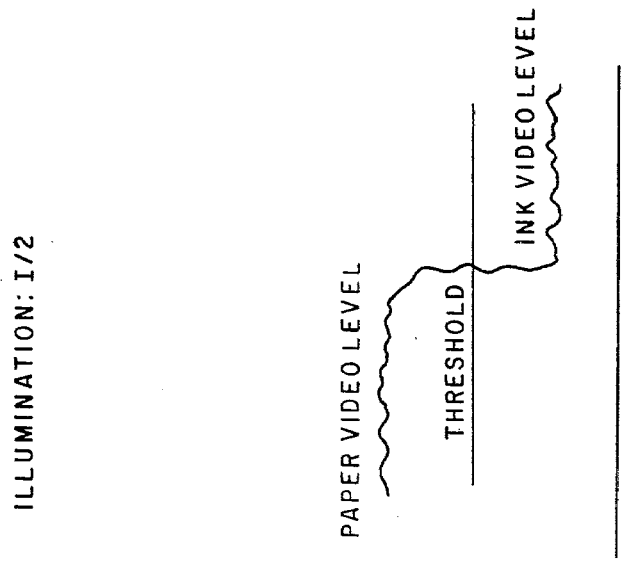
FIGS. 3 and 4 show the variations of the signal as read from a document by the imager.

FIG. 1 shows a CCD imager 10 with an image matrix 11 comprised of 324 columns of CCD pixels and 340 rows of CCD pixels. The image array drive lines 12 provide the drive line signals to the imager matrix 11 and to transfer gate 14. The transfer gate 14 has a CCD pixel position attached to each column of the imager matrix and is connected to the CCD output register 18 to selectively transfer an entire row of 324 CCD pixels, in parallel, from imager matrix 11 into output register 18.

U.S. patent application Ser. No. 115,986, by Warner C. Scott, filed Jan. 28, 1980, assigned to Texas Instruments Incorporated, shows a staring wand. U.S. patent application Ser. No. 42,749, by Joseph E. Hall, filed May 29, 1979, now U.S. Pat. No. 4,251,834 and assigned to Texas Instruments Incorporated, shows a CCD Imager. The CCD Imager shown in the Hall patent application uses a three phase CCD. An alternative CCD design is shown in U.S. patent application Ser. No. 906,385, by Jaroslau Hynecek, filed May 16, 1978, and assigned to Texas Instruments Incorporated. The Hynecek patent application shows a uniphase CCD structure that may be used in the CCD Imager used in this invention.

The output register 18 is a 324 stage serial CCD shift register fabricated on the same chip as the imager 11. A timing circuit 24 is connected to the output shift register 18 to shift the contents of the output shift register 18 through the adaptive threshold circuit 25 to a memory 27 in a manner to be described. Stages 1, 3, 5, 7, 9, 11, and 13 of the output shift register 18 are connected directly to the adaptive threshold circuit 25 by lines 31, 33, 35, 37, 39, 41, and 43, respectively, so that the analogue signal in each of these stages of the shift register 18 is applied to the adaptive threshold circuit 25. The sensing of the contents of CCD register 18 is well known in the art, and provides an analogue signal reflecting the intensity of that portion of the picture from the imager in the corresponding CCD pixel. The adaptive threshold circuit is described in more detail in FIG. 5.

Referring now to FIG. 2, a character "A" sensed from a piece of paper by a portion of the CCD imager is shown. This portion of the imager shown is 13 columns by 10 rows. Each square represents one CCD pixel with the shaded areas representing pixels contained within the stroke of the character as imaged on the CCD. As can be seen, the image captured by the portion of the imager shown in FIG. 5 is the character "A".

Figure 3:
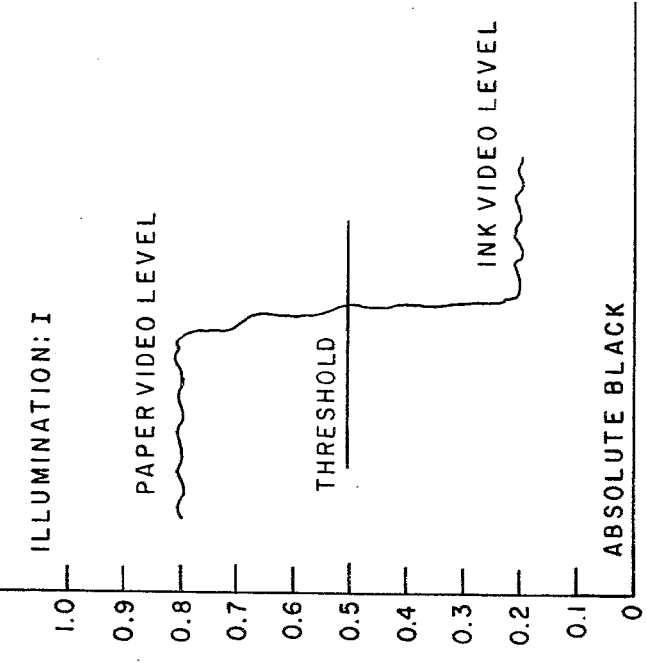

FIGS. 3 and 4 show the effects of non-uniform illumination effects of the analogue signals captured in the CCD pixels of the imager. Absolute black provides a zero signal captured by a CCD pixel. The amplified voltage signal captured by a CCD pixel normally varies from 0 volts for a reflection from absolute black to one volt for a reflection from absolute white. In FIG. 3 the ink reflection results in capturing 0.2 volts and the paper reflection results in capturing 0.8 volts for adjacent CCD pixels. In FIG. 4 the illumination on the image being read is one-half of the illumination of the image in FIG. 3, and the voltage captured by adjacent CCD pixels as represented in FIG. 4 is significantly less than that shown in FIG. 3. The voltage captured by the CCD pixel from the ink video level is approximately 0.1 volt while the voltage captured by the CCD pixel adjacent to the ink from the paper itself is only 0.4 volt.

Thus, it can be seen that if you have pixels reading different character images from the same paper with non-uniformity of illumination such as that shown in FIGS. 3 and 4, the voltages captured by the pixels will vary significantly. Since the purpose of the CCD imager is to read out a binary pattern representing a character, e.g., the letter "A", as opposed to rendering a grey scale image with a continuous range of voltage levels, a thresholding operation is required. The output from the threshold circuit is ideally a zero for the ink and one for the paper, or vice versa. In the presence of nonuniform illumination and system noise, operating with a fixed threshold level would be difficult or impossible.

Referring now to FIG. 5, the detailed circuitry of the adaptive threshold circuit 25 is shown. The CCD shift register 18 is again shown with stages 1 through 13 of the shift register shown. The output terminals 31 through 43 connect to corresponding stages of the shaft register. Output terminals 31, 33, 35, 39, 41, and 43 are connected through corresponding diodes 41, 43, 45, 49, 51, and 53 and are then connected together at a common terminal 54 through a resistor 55 to ground 57. Output terminal 37 from stage 7 of the output shift register 18 is connected to one input of comparator 59. Resistor 55 is a variable resistor with the adjustable tap 61 connected to the other input terminal of comparator 59. The output of comparator 59 is a digitized output connected to memory 27 which will be described in more detail later.

OPERATION

The operation of the invention will now be described. The imager shown in FIG. 1 will have read a character image such as the letter "A" shown in FIG. 2 at some point across the area of the imager. For the purposes of this description we can assume that the total image on the document underneath the imager 10 has been read with the pixels in the rows and columns having captured a voltage responsive to the images on the document. Assume for the purposes of this discussion that the letter "A" has been read and that rows 1, 2, 3, and 4 of the image shown in FIG. 2 have already been shifted sequentially into the output shift register 18 and then after thresholding shifted out into memory. Assume further for the purposes of this description that row 5 of the image shown in FIG. 2 is currently in the output register 18 with the voltages captured in the pixels in columns 1 through 13 of row 5 being that shown on line 8 of FIG. 2. This would mean that what is being sensed then for the purpose of determining the adaptive threshold are the outputs from columns 1, 3, 5, 7, 9, 11, and 13 of row 5. As can be seen in FIG. 2, pixels 1, 3, 7, and 13, the charges or voltages captured have resulted from the reflection from a paper while the charges stored in pixels 5, 9, and 11 result from an ink reflection. Thus, referring to FIGS. 3 and 4, the pixel voltages captured resulting from an ink reflection would range from probably 0.1 to 0.2 volt while the voltage captured from a paper reflection will simultaneously vary between 0.4 and 0.8. With a fixed threshold set midway between "black" and "white" levels in FIG. 4 (0.25 volts as illustrated) the noise margin when operating under the illumination conditions of FIG. 3 would be only 50 millivolts. Such a narrow margin would make the circuit susceptible to faulty quantization. Thus, the need and requirement for an adaptive threshold for each pixel becomes evident.

Referring now to FIG. 5 in connection with FIG. 2 what can be seen is that the outputs from output register 18 for pixels 1, 2, 5, 9, 11, and 13 are tied together through the diodes to point 54 which is connected through the resistor 55 to ground. Thus, the voltage at point 54 will track the greatest potential among pixels 1, 2, 5, 9, 11, and 13. By virtue of the spacing of these pixels one is assured to fall on a portion of the image representative of the paper. The potential at point 54 will measure the reflectance of the paper in the vicinity of the character. The output 61 is chosen to give a percentage output of the highest output voltages of these pixels 1, 3, 5, 9, 11, and 13. This percentage output is determined experimentally for the particular imager being used, for the documents being read, for the type of illumination in use, and for the environment in which it is being used. For instance, it has been found that for a normal illumination and a normal environment and a standard white-black document with the ink being of a relatively dense medium that taking 70 percent of the highest voltage from the specified pixels results in reliable quantization. This, of course, may be varied by the user depending upon the results and the environment under which the imager will be used. The threshold signal at point 61 is applied to one input of comparator 59. The other input of comparator 59 is the signal to be quantized taken from pixel 7 stored in the register 18. The two inputs to the comparator 59 are accordingly the output from pixel 7 and the 70 percent input threshold signal from a threshold circuitry. If the pixel 7 being sampled is above the 70 percent threshold, its quantization state is one indicating that it is reflected from a paper or inkless source and a binary signal of one is stored for that pixel in a corresponding memory 27. If it is below the 70 percent, it is reflected from an ink and the quantization state is zero and a binary signal of zero for that pixel is stored in the memory.

It can be seen that by the normal operation of the imager 11 with the information being shifted in row by row into the output shift register 18 and then shifted serially bit by bit or pixel by pixel out into a memory 27 that the contents of the different stages of shift register 18 will, of course, change with each shift of information to the right. Thus, there will be a continuous comparison of the threshold, determined as an assigned fraction of the largest voltage of the six pixels being sampled with the pixel to be quantized. The pixel being quantized, of course, is the pixel which is in stage 7 of the shift register. Thus, the contents of shift register 7 will, after quantization, be continuously outputted either as a one or a zero reflecting either an image of a character stroke (ink) or the surrounding (paper) background. This process continues until the total contents of a row are shifted out one by one into a memory 27. Thus, each pixel of each row except for those at the extreme edge on each side will be quantized according to a threshold determined by the voltage stored in the pixels surrounding the pixel which is itself being quantized.

For a particular application we have determined that a sample approximately 13 to 14 pixels wide provides excellent quantization when the maximum character image is 9 to 12 pixels wide. It is recognized that this invention is not limited to nor is the application necessarily limited to picking a field of view of this size. It could be expanded with more inputs. The field of view could be decreased, for instance, using one or two inputs for determining the threshold in quantizing the single pixel as being read out. The samples need not be consecutive nor confined to a pattern represented by a one-dimensional array. They are selected to assume at least one sample is representative of the reflectance of the paper in the vicinity of the character.

After this quantization pixel by pixel continues with each row being read in parallel into the output shift register and then the output shift register being serially read out one at a time so that each pixel will be quantized. Upon completion of transfer to memory, there will reside in memory a complete representation of the image that was read by the imager quantized to one/zero. With the quantized information in memory one can use standard logic and microprocessor or computers to determine the contents of the memory and the information can be printed out, stored, transmitted, displayed or other commonly employed uses of digital information.

In addition to the wand reading the alphanumeric information, one can use the standard bar codes which are used by some retail operations.

What is claimed is:

1. A CCD imager, said imager having a plurality of CCD's arranged into columns and rows, each CCD representing a pixel in said imager, each of said CCD pixels capturing an analogue signal, means for reading the analogue signal in each CCD pixel, and means for providing an adaptive threshold for the analogue signal captured by each CCD pixel, including means responsive to said adaptive threshold means for converting the analogue signal in each CCD pixel into a digital signal, wherein said adaptive threshold means includes means for sensing the analogue signal in a predetermined CCD pixel, means for sensing the analogue of at least one closely adjacent CCD pixel, means for comparing the amplitude of analogue signal from said predetermined CCD pixel and a predetermined percentage of the amplitude of the analogue signal from said closely adjacent CCD pixel, and means for converting said analogue signal from said predetermined CCD pixel into a digital signal as a result of said comparison.

2. The imager claimed in claim 1 including an output register, means for transferring said CCD pixels into said output register a column at a time, a memory, means for shifting said row of CCD pixels one CCD pixel at a time, into said memory, said adaptive threshold means for converting said CCD pixels one CCD pixel at a time into digital form as each CCD pixel is shifted into said memory.

3. The imager claimed in claim 2 wherein said means for sensing at least one adjacent CCD pixel is a diode.

4. The imager claimed in claim 3 wherein said sensing means for sensing adjacent CCD pixel sensing a plurality of adjacent CCD pixels, and said comparison means compares the amplitude of said predetermined CCD pixel with a predetermined percentage of amplitude of each of said adjacent sensed CCD pixels, and said conversion means converts said analogue signal from said predetermined CCD pixel into a first digital signal if the analogue signal from said predetermined CCD pixel is greater than said predetermined percentage of the amplitude at least one of the adjacent sensed CCD pixels, and into a second digital signal if it is less than said predetermined percentage.

5. An imager comprising:
   a plurality of CCDs, arranged in parallel columns, each said CCD comprising a plurality of pixels;
   means, connected to said plurality of CCDs, for reading the value of a selected one of said pixels;
   means, connected to said reading means, for defining a respective adaptive threshold corresponding to said selected pixel, based on the values of others to said pixels which are adjacent to said selected pixel; and
   means, connected to said adaptive threshold defining means, for quantizing the value of said selected pixel with respect to said corresponding respective adaptive threshold.

6. The imager claimed in claim 5, wherein said reading means comprises an output register, said output register being connected to each of said plurality of CCDs,
   and further comprising means for transferring said respective pixels of said plurality of CCDs into said output register one at a time.

7. The imager claimed in claim 6,
   further comprising a memory connected to said reading means, to said adaptive threshold means, and to said quantizing means, wherein said reading means further comprises means for transferring the contents of said output register into said memory, and wherein said quantizing means quantizes the value of each respective one of said pixels as the value of each said respective pixel is transferred into said memory.

8. The imager claimed in claim 7, wherein said respective pixels each generate an analog value according to the image received by said imager.

9. The imager claimed in claim 8,
wherein said adaptive threshold means defines an adaptive threshold which is equal to a predetermined percentage of the value of at least one pixel which is closely adjacent to said selected pixel.

10. The imager claimed in claim 9,
wherein said adaptive threshold means is connected to read the values of a plurality of said pixels which are adjacent to said selected pixel, and wherein said adaptive threshold corresponding to said selected pixel is equal to a fixed percentage of the value of the one of said adjacent pixels having the highest value of said adjacent pixels.

11. The imager claimed in claim 10, wherein said adaptive threshold defining means detects the value of the one of said pixels adjacent to said selected pixel which has the highest value by means of a plurality of diodes, said plurality of diodes being connected to respective stages of said output register.

12. The imager claimed in claim 11, wherein said quantizing means compares the value of said selected pixel with said corresponding respective adaptive threshold, and wherein said quantizing means converts the value of said selected pixel into a first digital signal if the value of said selected pixel is greater than said adaptive threshold, and into a second digital signal if the value of said selected pixel is less than said corresponding adaptive threshold.

* * * * *